Figure 1:
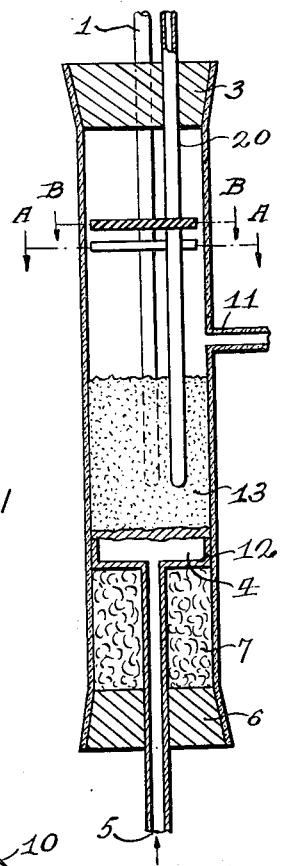

Inventors
HERBERT S. JOHNSON
ARTHUR H. ANDERSEN

By D.R. Morrison

AGENT

United States Patent Office 3,009,781
Patented Nov. 21, 1961

3,009,781
PROCESS FOR PREPARATION OF CARBON DI-SULPHIDE AND FOR THE DESULPHURIZATION OF COKE
Herbert S. Johnson, Shawinigan Falls, Quebec, and Arthur H. Andersen, Mount Royal, Quebec, Canada, assignors to Shawinigan Chemicals Limited, Montreal, Quebec, Canada, a corporation of Canada
Filed Apr. 8, 1957, Ser. No. 651,472
Claims priority, application Canada Feb. 23, 1957
5 Claims. (Cl. 23—206)

This invention relates to the electrothermic preparation of carbon disulphide by reaction of hydrogen sulphide with carbon particles maintained in a fluidized state, and to the reduction of the sulphur content of coke particles by treatment with a gaseous desulphurizing agent in a fluidized bed heated by the passage of electricity through the bed.

Carbon is known to produce carbon disulphide when reacted with hydrogen sulphide at elevated temperature. The practice heretofore has been to pass hydrogen sulphide through a stationary bed of carbon. Equilibrium yields have been calculated for this reaction by Owen, Sykes and Thomas in Trans. Faraday Soc. 47, 419–428 (1951), from thermodynamic data. Known processes generally employ externally-fired reactors or reactors which are heated internally by the passage of an electric current through the stationary bed.

It is an object of the present invention to produce carbon disulphide by reacting hydrogen sulphide with a fluidized bed of carbon particles heated by the passage of electricity through the bed.

It is also an object of this invention to provide a process for reducing the sulphur content of coke.

The high sulphur content of petroleum coke from most sources renders it unsuitable for many important commercial coke uses. This fact has operated to set very narrow limits upon the market for what would otherwise be an inexpensive and readily available source of energy for chemical and metallurgical reactions. Moreover, the presently known methods for desulphurizing coke require heavy investments of capital for equipment such as separate heat generating units, wasteful heat transfer systems, and reactors lined with costly refractories and insulating material.

It has been found according to the present invention that by passing an electric current through finely divided electrically conductive carbon particles maintained in a fluidized state, sufficient heat can be generated to attain the high temperature necessary to react hydrogen sulphide with the carbon particles at commercially useful rates.

One form of the invention thus consists in a process for the electrothermic production of carbon disulphide from finely divided, electrically conductive carbon particles and hydrogen sulphide, comprising passing a stream of gas comprising hydrogen sulphide upwardly through a bed of finely divided electrically conductive carbon particles, maintaining the bed in a fluidized state by the passage of said gas therethrough, passing an electric current through the fluidized bed with sufficient power to maintain a temperature which sustains the reaction between the hydrogen sulphide and the carbon particles, and recovering carbon disulphide from the gases coming off the fluidized bed.

For example, hydrogen sulphide gas can be passed upwardly through a bed of suitably sized conductive carbon particles, e.g. calcined petroleum fluid coke, a by-product from a fluidized bed petroleum coking process, the volume of gas (hydrogen sulphide augmented if necessary by additional gas inert under the reaction conditions) being sufficient to fluidize the carbon particles; an electric current can be passed through the fluidized bed with sufficient power to heat the hydrogen sulphide and carbon to a high reaction temperature and to supply the endothermic heat of reaction for the formation of carbon disulphide therefrom. Gases coming from the fluidized bed can be cooled and carbon disulphide recovered therefrom in a suitable manner, e.g. by absorbing the carbon disulphide from the gases with suitable oil in a scrubbing operation and subsequently stripping the carbon disulphide from the oil.

Coke is particularly suitable as the carbon material used in making up the fluidized bed. It is well known that coke is electrically conductive, and petroleum coke by-product of fluidized bed petroleum coking processes is in particulate form readily suitable for use in other fluidized bed processes. As produced in fluidized bed petroleum coking processes, petroleum coke has a very high resistivity (of the order of 500 megohms between two parallel ¼ inch graphite electrodes immersed to a depth of 1 inch and spaced ½ inch apart in a stationary bed of the coke), but on simple calcination at elevated temperature, resistivity measured as above decreases greatly (e.g. to about 10 ohms) and the calcined coke has ample conductivity to carry electrical current through a fluidized bed thereof at convenient voltages. Said calcination of the coke particles may be carried out, for example, by heating in a thin layer for a few minutes to about 700° C. in a current of air. Therefore use is preferably made of petroleum coke, product of a fluidized bed petroleum coking process, which has been heated i.e. calcined to drive off undesirable volatile matter and to increase its conductivity at least to such an extent that at the voltage available on the power circuit sufficient power can be passed through the bed to bring it to the desired temperature. Fluid petroleum coke is inexpensive, and it has a very low ash content; its sulphur content, frequently so high as to make it unsuitable for many other applications, is converted to carbon disulphide by reaction with the carbon particles, thereby raising the yields of carbon disulphide. Fluid petroleum coke can be prepared according to the methods described in U.S. Patent No. 2,734,020 or U.S. Patent No. 2,700,017 or by any other equivalent method.

Within the range of reaction temperatures investigated for this specification, an increase in temperature produced an increase in the yield of carbon disulphide based on the hydrogen sulphide fed to the reaction. In preferred embodiments of the invention, temperatures employed in the preparation of carbon disulphide are in the range 1200–1600° C. However, temperatures as low as 1000° C. have been used successfully and temperatures about 800–900° C. are probably the minimum practicable. Most preferably, the temperature of the reaction is maintained at 1500–1600° C. Since the reactants tend to establish an equilibrium, contact time is not critical provided it is long enough to give a commercially useful yield on the hydrogen sulphide fed. Contact times of the order of one to two seconds are adequate at these temperatures.

Figure 3:
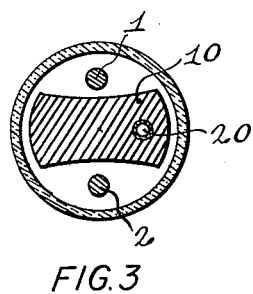
Figure 2:
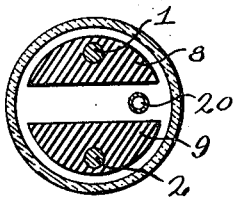

A simple apparatus for carrying out the process of the invention is illustrated in the accompanying drawings in which FIGURE 1 illustrates diagrammatically the arrangement of the elements of a suitable reactor, FIGURE 2 shows a cross-section of the reactor on the line A—A of FIG. 1, and FIGURE 3 shows a cross-section of the same reactor on the line B—B of FIG. 1. FIGURE 1 shows a reactor tube 12, suitably of glass or refractory ceramic, with a bottom closure 6, through which a gas inlet 5 leads to a gas disperser 4. The space between the disperser 4 and the closure 6 is filled with thermal insulation 7, for example petroleum coke particles. A gas outlet 11 is arranged in the wall of the reactor above the surface of a bed of finely divided electrically conductive carbon particles 13, but well below a top closure 3. Electrodes 1 and 2 pass through the top closure 3, as does a thermocouple well 20. Radiation shields 8, 9, 10 (FIGURES 2 and 3) are supported from the electrodes and thermocouple well, as shown in FIGURE 1. Electrodes 1 and 2 extend into the bed of fine particles 13, comprising electrically conductive carbon to be fluidized by gas entering at 4. Hydrogen sulphide is passed through a flow meter, and then directed to the inlet 5. The gas outlet 11 leads to a vent or to an absorption train (not shown).

The process of the invention is illustrated, but not limited by the following examples.

To carry out Example 1, a small laboratory reactor was made from high temperature resistant "Vycor" glass. This reactor was generally cylindrical in shape, with a roughly conical bottom. It was 1½ inches in diameter and about 5½ inches long. An inlet at the bottom of the reactor was provided, through which gas could be passed upwardly through the reactor. In the top there were located an outlet tube to conduct gases from the reactor to a recovery system, and two openings for the insertion of electrodes to the reactor.

A sample of petroleum coke, by-product of a fluidized bed petroleum coking process, received from the Billings, Montana, refinery of the Carter Oil Company, was calcined and the calcined coke screened on a No. 14 U.S. Standard Sieve having 1.41 mm. openings. The coarse particles retained on the screen were all less than about ¼ inch diameter. The bottom part of the reactor, for a height of about 2 inches, was filled with the coarse coke fraction. On top of this was placed a layer of about 1½ inches of the fine particle fraction of the screened coke. Two ¼ inch diameter graphite electrodes were inserted through the top of the reactor and into the bed of fine coke to a depth of about 1 inch, leaving a minimum distance of about one-half inch between the electrodes and the coarse coke particles. The electrodes were inserted vertically, spaced about ¾ inch apart, and their depth of immersion in the coke could be adjusted. The tops of the electrodes were connected in series with an ammeter and the output of a variable voltage autotransformer having a continuous range of 0 to 300 volts output with 9 amperes maximum current capacity from a 220 volt alternating current supply. A voltmeter was also connected across the electrodes to permit reading of the voltage applied to the electrodes.

Hydrogen sulphide gas from a commercial cylinder of compressed hydrogen sulphide was passed through a rotameter and into the inlet of the reactor, upwardly through the coke therein. Voltage was then applied to the electrodes from the transformer at an initially low value that was gradually increased. The lower part of the bed of coarse coke particles in the reactor acted as a gas distributor and distributed the gas across the total cross-sectional area of the reactor; at the low gas flow rates used these coarse particles were not fluidized. On entering the bed of fine coke particles the gas was heated by the hot fine coke particles through which the current was flowing and consequently the gas expanded. The volume rate of flow of the expanded gas through the bed of fine coke particles was sufficient to maintain the bed in a fluidized condition, and the fine coke particles were all kept in a state of rapid random motion characteristic of a fluidized bed. With all the fine coke particles in a fluidized state, the electrodes were touching only a fluidized solids phase and the electrical conductivity between them could be only through this phase. The temperature of the fluidized bed increased sufficiently to cause the bed to glow and the temperature could be read with an optical pyrometer; the coarse coke particles beneath the fluidized particles remained stationary and relatively cool, there being no visible heat flow in these particles. During the reaction period, a current of 2.1 to 2.3 amperes was passed through the fluidized bed, with the voltage applied to the electrodes being controlled at 300 volts to maintain the bed at an elevated temperature. The temperature, as measured with the optical pyrometer, was observed to vary from an initial value of about 1500° C. at the start of the reaction period, increasing gradually to about 1565° C. at the end.

The reactor used for Examples 2–5, was assembled as shown in FIG. 1. The reactor tube was of "Vycor" glass, having inside and outside diameters of 34 and 38 mm. respectively. The ¼ inch graphite rods used as electrodes were connected to an alternating current supply of adjustable voltage and were made to penetrate the fluid bed to a depth of approximately one inch. The other components were of standard design. The bed consisted of a depth of about 1½ inches of petroleum coke particles made by a commercial petroleum fluid cooking process from petroleum residues. The coke, received from the Billings, Montana, refinery of the Carter Oil Company, was first screened in the manner described for Example 1 and the particles retained on the screen were rejected. The smaller particles had no effective electrical conductivity, but they were made conductive by heating, i.e. calcining them at about 900° C. for two hours.

Hydrogen sulphide gas was fed to the apparatus at inlet 5 and A.C. power was applied until the desired temperature was reached. The temperature of the bed in Example 2 was estimated to be about 1000° C., and was successively higher in Examples 3–5, although lower than 1500° C. Currents and voltages used in Examples 2–5 are shown in Table I.

TABLE I

| Example No. | Current (Amps.) | Voltage (volts) |
| --- | --- | --- |
| 2 | 10 | 60 |
| 3 | 6–7 | 90 |
| 4 | 1.7 | 220 |
| 5 | 3 | 160 |

In each of these Examples 1–5, when steady conditions had been achieved, the product gases coming from the reactor were all diverted into the absorption train, described below. At the end of the reaction period, the flow of hydrogen sulphide gas was turned off and a current of nitrogen substituted therefor to purge the reactor and carry residual unreacted hydrogen sulphide into the absorption train.

The absorption train used to recover the products, based on that used by Owen et al., Trans. Faraday Soc., 49, 1200 (1953), was made up as follows:

(1) A column of granular anhydrous calcium chloride which absorbed and removed from the products any extraneous moisture, solid elemental sulphur, and entrained carbon.

(2) A column of granular copper phosphate which absorbed quantitatively the hydrogen sulphide in the product gases.

(3) Two columns in series containing active carbon which absorbed the carbon disulphide in the product gases.

(4) A column of heated copper oxide which reacted with hydrogen in the product gases to form water vapour.

(5) A column of granular anhydrous calcium chloride which absorbed the water formed from the hydrogen in the previous column.

(6) A column of "Ascarite" absorbent (sodium hydroxide dispersed on asbestos), to absorb any carbon dioxide formed by oxidation of hydrocarbons in the copper oxide column.

These absorption columns were all of a type suitable for weighing on an analytical balance.

The active carbon at the end of one example was added to water and distilled to recover dry carbon disulphide. The weight of carbon disulphide so recovered was in agreement with the result obtained by weighing the active carbon column.

The quantitative data are shown in Table II. For each example, the flow rate of $H_2S$ feed was measured at room temperature and atmospheric pressure. Since one mole of hydrogen sulphide produces one mole of hydrogen on decomposition to its elements or on reaction to carbon disulphide, the sum of the millimoles of "$H_2S$ Recovered" and "$H_2$ Recovered" represents the amount of hydrogen sulphide fed. The "Conversion" is the fraction of the hydrogen sulphide fed which is not recovered as such (e.g. Ex. 1; 13.8/(31+13.8)=30.8%). The "Yield of $CS_2$ on $H_2S$ Converted" is the fraction of the hydrogen sulphide not recovered as such which appears as carbon disulphide; one mole of carbon disulphide corresponds to two moles of hydrogen sulphide (e.g. Ex. 1; 5.8 ×2/13.8=84%).

TABLE II

| Ex. No. | $H_2S$ Feed (cc./min.) | $H_2S$ Recovered (mmoles) | $H_2$ Recovered (mmoles) | $CS_2$ Recovered (mmoles) | Conversion, percent | Yield of $CS_2$ on $H_2S$ Converted, percent |
|---|---|---|---|---|---|---|
| 1 | 100 | 17.0 | 40.1 | 19.5 | 70.0 | 97.4 |
| 2 | 210 | 31 | 13.8 | 5.8 | 30.8 | 84 |
| 3 | 140 | 21.7 | 11.7 | 6.5 | 35.0 | 111 |
| 4 | 130 | 24.45 | 27.15 | 13.3 | 52.5 | 98.3 |
| 5 | 100 | 11.75 | 23.75 | 12.3 | 67.0 | 104 |

The yields which exceed 100% indicate that some of the sulphur originally present in the petroleum coke (5.2%) had reacted. This was confirmed by passing nitrogen instead of hydrogen sulphide through fluidized coke in the reactor used in the examples, and recovering and identifying carbon disulphide from the product gas stream. Additional confirmation was provided by the observation that a sample of the same coke contained only 0.4% sulphur after being subjected to a flow of hydrogen sulphide in a larger reactor for ten hours at about 1500° C. The process is obviously a method of desulphurizing coke.

Another form of the invention comprises, in its basic embodiment, a process for reducing the sulphur content of finely divided electrically conductive coke particles in a fluidized bed by passing through the bed an electric current of sufficient power to maintain the bed at an appropriate elevated temperature, and treating the coke therein with a gaseous desulphurizing agent. The process is especially adapted to treat petroleum coke, product of a fluidized bed petroleum coking process which has been heated to drive off volatile matter and to increase its conductivity at least to such an extent that, at the voltage available on the power circuit, sufficient power can be passed through the bed to bring it to the desired temperature.

A simple apparatus for carrying out the process of this form of invention is illustrated in the drawings which have already been described above. The selected desulphurizing gas is directed to the inlet 5 as is hydrogen sulphide in the description above.

For the group of exemplary operations described in Examples 9 to 18 below, the foregoing apparatus was modified as follows. The disperser 4 was omitted and the inlet 5 fed the gas into the bottom of bed 7 of coarse coke which acted effectively as a disperser. In other exemplary operations extending for periods exceeding one hour at temperatures at which a glass tube would begin to soften, as described in Examples 6 to 8 below, a graphite cylinder was employed, 1.5 inches inside diameter, and 3.5 inches outside diameter. One central electrode passed into the bed of coke through the open top of the cylinder and the cylinder served as the other electrode. The bottom was sealed by castable refractory cement into which the inlet tube was cast.

This form of the process, in its unmodified basic embodiment, works best when the desulphurization takes place at temperatures above 1200° C., for example between 1200° and 1700° C. Nitrogen, hydrogen sulphide, carbon monoxide, and commercial gases comprising predominantly carbon monoxide, for example carbide furnace gas, are especially effective desulphurizing agents at 1500° C. and the sulphur content of the coke samples is substantially reduced by treatments of one-half to one hour.

As noted above, the fluid petroleum coke referred to in this specification can be prepared by methods described by J. W. Brown in U.S. Patents 2,700,017 and 2,734,020, or equivalents. Such cokes may have sulphur contents ranging from about 3% to 10% or even higher and the present process is effective to reduce their sulphur content to commercially acceptable values. Calcination and its effect on resistivity of the coke have been discussed above.

In the prior art it has been shown that the effectiveness of hydrogen as a desulphurizing agent at temperatures below those mentioned above is increased if the coke is subjected to a preoxidation treatment with an oxygen containing gas, e.g. air. Both these operations can be carried out with the coke fluidized by the respective gases and heated by an electric current through the fluidized bed of coke. Since the bed temperatures for the preoxidation treatment are considerably lower than the temperatures at which desulphurization is carried out, the rate of gas flow required to maintain the bed in a fluidized condition is higher. Consequently, in the apparatus described above, a gas flow rate of about 800 cc./min. is necessary to maintain good fluidization of the coke particles at 325° C. whereas the same effect can be achieved at 1600° C. with gas flow rates as low as 140 cc./min., both rates being measured at room temperature. Good results are obtained by preoxidizing the coke at 300° to 450° C. until its weight is reduced by 10% to 20%, a preferred temperature range being 300° to 350° C. Higher preoxidation temperatures result only in lower coke yields without rendering the following hydrogen treatment more effective. For the subsequent desulphurization with hydrogen, temperatures in the range from 650° to 800° C. may be used, but the range 675° to 725° C. is preferred and is effective in three or four hours; 800° C. is a decidedly less effective temperature. Preoxidation does not appreciably improve desulphurization at temperatures over 1200° C.

We have also found that the effectiveness of hydrogen as a desulphurizing agent for coke which has not been preoxidized is increased if the coke is impregnated with an alkali metal compound, for example, hydroxide or a carbonate of potassium or sodium. Calcium hydroxide and calcium oxide are less effective. The alkali metal compounds may be used in amounts up to nine percent by weight of the coke. Preferably, the coke is treated with aqueous solutions of these alkali metal compounds in amounts to provide at least one percent of the compound based by weight on the coke, and more preferably 2% to 8%. These alkali metal compounds are ineffective to catalyze the desulphurization of coke by nitrogen. The effectiveness of hydrogen is still further increased if both preoxidation and alkali treatments are applied to the coke.

We have also found that the effectiveness of desulphurization by carbon monoxide or carbide furnace gas, by hydrogen sulphide, or by refinery tail gas (consisting essentially of hydrogen in major amounts with minor amounts of nitrogen and $C_1$ to $C_3$ hydrocarbons) is improved if both the preoxidation and alkali treatments as described above are used.

In the following examples gas flow rates are given in terms of gas volumes at room temperature and atmospheric pressure. For temperatures of the order of 1400° to 1500° C. the power was supplied at voltages (A.C.) ranging from 100 to 200 volts and currents ranging from 5 to 20 amperes. For low temperatures of the order of 700° C. the voltages ranged from 40 to 300 volts and currents were 2 to 12 amperes.

Example 6

Into the apparatus described above was placed 40 grams of fluid petroleum coke obtained from the Billings, Montana, refinery of the Carter Oil Company. The coke was screened to remove particles coarser than 14 mesh, U.S. Standard Sieve, and previously calcined as already noted. Nitrogen was passed through the apparatus at a rate of 300 cc./min. which maintained the coke in the fluidized state. Alternating current power was applied to the electrodes and adjusted to bring the temperature of the fluidized bed to and maintain it at about 1400° C. The voltage which was 220 volts initially was finally maintained at 100 volts as the conductivity of the coke increased; the current was 1.3 amperes at the beginning, then increased to 8 to 12 amperes, then 10 to 15 amperes, and finally 5 to 20 amperes; the current was not steady even though the voltage was constant at any given time; the lowest and highest readings of the current as just stated thus indicate the extremities of an operating range. Samples of the coke were analyzed for sulphur at one hour intervals:

| Time: | S content, percent |
|---|---|
| Original | 4.48 |
| 1 hour | 1.50 |
| 2 hours | 1.02 |
| 3 hours | 0.61 |
| 4 hours | 0.54 |

Examples 7 and 8

The procedure of Example 6 was repeated except that industrial carbon monoxide (carbide furnace gas) and commercial hydrogen sulphide, respectively, were used at temperatures, for the times, and with the results shown in Table I. The furnace gas had the following analysis:

| | Percent |
|---|---|
| Carbon monoxide | 83.0 |
| Hydrogen | 10.0 |
| Nitrogen | 4.8 |
| Carbon dioxide | 1.0 |
| Unsaturated hydrocarbons | 0.5 |
| Methane | 0.4 |
| Oxygen | 0.3 |

In Example 8, the voltage intially 120 volts, during operation increased to 170 volts and then decreased to 140 volts. The current initially was 1.0 ampere and subsequently remained in the range 11 to 16 amperes.

Example 9

In Example 9 the apparatus comprised a glass reactor tube as described above with reference to the drawings. A fresh sample of petroleum coke was preoxidized by passing air through the bed at a flow rate of 800 cc./min. at 325° C. for four hours. This was followed by the passage of commercial hydrogen, with the temperature of the bed raised to and maintained at 700° C. for four hours. The voltage increased from 200 to 295 volts during the run, while the current ranged between 2 and 6 amperes. The sulphur content of the coke was reduced from 4.46% to 1.09%. The weight of coke was reduced from 50.0 to 42.3 grams, an overall loss by oxidation and desulphurization of 15.4%.

Examples 10 and 10a

Forty grams of fluidized coke (after calcination to give it effective conductivity) were stirred in 200 ml. of 20% aqueous solution of sodium hydroxide overnight, filtered off, and dried at 110° C. for three and one-half hours. The dry coke, containing 3.65% sodium hydroxide by weight, was charged to a reactor as described above. The procedure of Example 6 was then repeated except that hydrogen was used at a flow rate of 500 cc./min. and a temperature of 700° C. for four hours in lieu of the nitrogen of Example 6. The voltage in Example 10 was 130 volts at the beginning and 120 volts finally, while the current remained close to 2.5 amperes throughout the run. The sulphur content of the coke was reduced from 4.20% to 0.78%. A parallel experiment (10a) using coke not impregnated with sodium hydroxide reduced the sulphur content only to 2.33%.

Examples 11, 11a, 12, 12a, 13 and 14

For these examples, calcined fluid coke was subjected to oxidation in the apparatus using the procedure described in Example 9 above. The oxidized coke was then removed from the apparatus, treated with aqueous solutions of sodium hydroxide as shown in Table I, dried as described in Example 10 above, and returned to the apparatus. The procedure of Example 6 was then followed using industrial carbon monoxide (carbon furnace gas as used in Example 7), refinery tail gas, hydrogen sulphide, and hydrogen in Examples 11, 12, 13, and 14 respectively, at 700° C. for four hours in each example, in lieu of the nitrogen of Example 6. Parallel experiments using coke without alkali were made using furnace gas and refinery gas (Examples 11a and 12a). The results are shown in Table I. The composition of the refinery tail gas was:

| | Percent |
|---|---|
| Hydrogen | 49.7 |
| Saturated hydrocarbons ($C_1$ to $C_3$) | 19.3 |
| Unsaturated hydrocarbons | 11.7 |
| Nitrogen | 13.4 |
| Carbon dioxide and hydrogen sulphide | 6.0 |

More specifically, in Example 11, a 50 gram charge of fluidized petroleum coke was calcined to make it conductive and was then preoxidized at 325° C. for four hours with a flow of 500 cc./min. of air. The charge was cooled and placed in 200 ml. of 20% aqueous sodium hydroxide solution, and stirred overnight. The coke was filtered off and dried for three hours at 110° C. The weight increase of the coke due to absorption of sodium hydroxide was 8.5%. The coke was then put back into the reactor and was fluidized with furnace gas at a velocity of 500 cc./min. for four hours at 700° C. The total burnoff, that is, loss of weight, after both treatments was 7.8 grams, or 15.6% of the original charge. The voltage during the desulphurization step was about 135 volts and the current was 3 to 5 amperes. The sulphur analysis was 4.20% before treatment, and 0.92% after treatment.

In Example 11a, the voltage was initially 170 volts, and gradually fell to 75 volts; the current was 4 to 6 amperes at the outset and 6 to 12 amperes for the remainder of the run.

In Example 12, the voltage began at 130 volts, fell to 60 volts when the reaction temperature was reached and remained at 60 volts for four hours. The current ranged between 3 and 3.5 amperes.

In Example 12a, voltage decreased from 200 to 70 volts and the current, beginning at 2 amperes, subsequently ranged from 8 to 11 amperes. The burnoff was 5.2%.

In Example 13, the voltage began at 130 volts and finally was lowered to 40 volts. The current varied between 2 and 3 amperes.

In Example 14, the voltage was initially 200 volts, later fell to 160 volts and ended at 165 volts. The amperage ranged from 2 to 3.

Table I lists the example number in the first column, the duration of the preoxidation treatment and its temperature in the second column. In the third column is given the concentration of the sodium hydroxide solution used in impregnating the coke. The next three columns list the gas used in the desulphurization process, the temperature and duration of treatment. The last two columns record the percentage of sulphur in the coke before and after treatment.

TABLE I.—PERCENTAGE SULPHUR IN COKE, BEFORE AND AFTER TREATMENT

| Ex. | Oxidation | Alkali | Gas | °C. | Hrs. | Before | After |
|---|---|---|---|---|---|---|---|
|   |   |   |   |   |   | Percent | Percent |
| 6 | None | None | Nitrogen | 1,400 | 1 | 4.48 | 1.50 |
| 7 | do | do | Furnace gas | 1,500 | 1 | 4.43 | 2.03 |
| 8 | do | do | Hydrogen sulphide | 1,500 | 0.5 | 4.46 | 1.80 |
| 9 | 4 hrs. at 325° | do | Hydrogen | 700 | 4 | 4.46 | 1.09 |
| 10 | None | 20% soln | do | 700 | 4 | 4.20 | 0.78 |
| 10a | do | None | do | 700 | 4 | 4.20 | 2.33 |
| 11 | 4 hrs. at 325° | 20% soln | Furnace gas | 700 | 4 | 4.20 | 0.92 |
| 11a | do | None | do | 700 | 4 | 4.20 | 3.44 |
| 12 | do | 12% soln | Refinery gas | 700 | 4 | 4.20 | 2.27 |
| 12a | do | None | do | 700 | 4 | 4.20 | 3.56 |
| 13 | do | 8% soln | Hydrogen sulphide | 700 | 4 | 4.20 | 1.85 |
| 14 | do | 20% soln | Hydrogen | 700 | 4 | 4.46 | 0.14 |

*Examples 15, 16, 17, and 18*

Experiments with fluid coke from a different source, which contained 8.65% sulphur, are summarized in Table II. These examples show that a higher sulphur content does not appreciably change the effectiveness of the desulphurization. In Examples 15, 16, and 17, preoxidation was carried out for four hours at 325° C., while there was no preoxidation treatment in Example 18. The coke used in Examples 16 and 17 was impregnated with 20% sodium hydroxide solution, which added 4.0% and 2.8%, respectively, to the weight of the coke. In Examples 15 and 16, the coke was treated with hydrogen for four hours at 700° C.; in Example 17, the same carbide furnace gas was employed as in Examples 7 and 11, for four hours at 700° C., and in Example 18, nitrogen was used for 1.5 hours at 1350° C.

Voltages in the four examples began at 130 volts and later in the runs were 75, 65, 30 and 130 volts, respectively, while the currents were 6, 5 to 6.7, 9, and 13 to 16 amperes respectively. The flow rates of gas were as follows: In Examples 15 and 16, 800 cc. of air/min. for preoxidation, and 600 cc. of hydrogen/min. for desulphurization. In Example 17, 800 cc. of air/min. was used as before, and 500 cc./min. of furnace gas. In Example 18, no preoxidation treatment using air was given and nitrogen during desulphurization was passed through at 600 to 700 cc./min.

Table II lists the example number in the first column, the duration of the preoxidation treatment and its temperature in the second column; in the third column is given the concentration of the sodium hydroxide solution used in impregnating the coke. The next three columns list the gas used in the desulphurization process, the temperature and duration of treatment. The final column records the percentage of sulphur in the coke after treatment.

TABLE II.—DESULPHURIZATION OF PETROLEUM COKE CONTAINING 8.65% SULPHUR

| Ex. | Oxidation | Alkali | Gas | °C. | Hrs. | Percent S After |
|---|---|---|---|---|---|---|
| 15 | 4 hrs. at 325° C. | None | $H_2$ | 700 | 4 | 1.27 |
| 16 | do | 20% NaOH | $H_2$ | 700 | 4 | 0.52 |
| 17 | do | 20% NaOH | Furnace gas | 700 | 4 | 2.90 |
| 18 | None | None | $N_2$ | 1,350 | 1.5 | 1.30 |

The source of electricity for supplying the heat energy to the fluidized bed can be either direct current or alternating current. In a preferred embodiment of this invention, alternating current source is used, mainly because of its ready availability.

This application is a continuation-in-part of application Serial Number 568,325, filed February 28, 1956, now Patent No. 2,948,587, the disclosure of which application in its entirety, is hereby incorporated by reference into this case, and the entire disclosure of our copending application entitled "Process for Desulphurization of Coke," filed of even date herewith, Serial No. 651,208, and now abandoned, is likewise incorporated by reference into this application.

What is claimed is:

1. A process for the electrothermic production of carbon disulphide from finely divided, electrically conductive carbon particles and hydrogen sulphide, comprising passing a stream of gas comprising hydrogen sulphide upwardly through a bed of finely divided electrically conductive carbon particles, maintaining the bed in a fluidized state by the passage of said gas therethrough, passing an electric current through the fluidized bed with sufficient power to maintain a temperature which sustains the reaction between the hydrogen sulphide and the carbon particles, and recovering carbon disulphide from the gases coming off the fluidized bed, and said carbon particles being fluid petroleum coke produced in a fluid bed petroleum coking process and calcined to increase their electrical conductivity, the fluidized bed being maintained in the range of substantially 1000–1600° C.

2. A process for reducing the sulphur content of finely divided electrically conductive carbon particles containing sulphur which comprises passing a stream of a desulphurization gas selected from the group consisting of nitrogen, carbon monoxide, hydrogen, mixtures of carbon monoxide, hydrogen and nitrogen, and hydrogen sulphide upwardly through a bed of the finely divided electrically conductive particles, maintaining the bed as a fluidized mass by passing said gas upwardly through the bed, maintaining the bed at reaction temperature by passing electric current through the fluidized bed with sufficient power to maintain the bed at a temperature above 650° C., said carbon particles being fluid petroleum coke produced in a fluid bed petroleum coking process and calcined to increase their electrical conductivity, the said gas being passed through the hot coke until the sulphur content of the coke is substantially reduced.

3. A process according to claim 2, wherein said coke, prior to passing the stream of desulphurization gas therethrough is subjected to oxidizing by heating it in the presence of an oxygen containing gas at a temperature within the range of 250–475° C. for a time sufficient to cause a reduction in weight of the coke within the range between 10 and 20%.

4. A process for reducing the sulphur content of finely divided electrically conductive carbon particles containing sulphur which comprises subjecting the carbon particles to oxidizing by heating in the presence of an oxygen containing gas at a temperature within the range of 250–475° C. for a time sufficient to cause a reduction in weight of the carbon particles within the range between 10 and 20%, passing a stream of desulphurization gas which is a mixture of nitrogen, hydrogen and $C_1$–$C_3$ hydrocarbons through the carbon particles, maintaining the bed as a fluidized mass by passing said desulphurization gas upwardly through the bed, maintaining the bed at reaction temperature by passing electric current through the fluidized bed with sufficient power to maintain the bed at a temperature above 650° C., said carbon particles being fluid petroleum coke produced in a fluid bed petroleum coking process and calcined to increase their electrical conductivity, the said desulphurization gas being passed through the hot coke until the sulphur content of the coke is substantially reduced.

5. A process according to claim 2 wherein the desulphurization gas is hydrogen and the coke is impregnated with an alkali metal compound selected from the group consisting of potassium hydroxide, sodium hydroxide, potassium carbonate, sodium carbonate, calcium hydroxide, and calcium oxide.

References Cited in the file of this patent

UNITED STATES PATENTS

| | | |
|---|---|---|
| 1,193,210 | Walter | Aug. 1, 1916 |
| 1,857,799 | Winkler | May 10, 1932 |
| 2,443,854 | Ferguson | June 22, 1948 |
| 2,475,607 | Garbo | July 12, 1949 |
| 2,721,169 | Mason et al. | Oct. 18, 1955 |
| 2,739,105 | Ford et al. | May 20, 1956 |

FOREIGN PATENTS

| | | |
|---|---|---|
| 314,060 | Great Britain | Sept. 4, 1930 |
| 486,848 | Italy | Nov. 18, 1953 |

OTHER REFERENCES

Fluidized Solids, Chem. Eng., May 1953, pages 219–231.